US012614374B2

(12) United States Patent
Gleed et al.

(10) Patent No.: US 12,614,374 B2
(45) Date of Patent: Apr. 28, 2026

(54) SYSTEMS AND METHODS FOR GENERATING SYNTHETIC DATA FOR STATIC BACKGROUND MODELS

(71) Applicant: ALWAYSAI, INC., Solana Beach, CA (US)

(72) Inventors: Todd Gleed, San Marcos, CA (US); Shesh Mali, Carlsbad, CA (US)

(73) Assignee: ALWAYSAI, INC.

(*) Notice: Subject to any disclaimer, the term of this patent is extended or adjusted under 35 U.S.C. 154(b) by 204 days.

(21) Appl. No.: 18/461,370

(22) Filed: Sep. 5, 2023

(65) Prior Publication Data

US 2025/0078459 A1    Mar. 6, 2025

(51) Int. Cl.
| | |
|---|---|
| *G06K 9/00* | (2022.01) |
| *G06F 18/2415* | (2023.01) |
| *G06V 10/764* | (2022.01) |

(52) U.S. Cl.
CPC ........ G06V 10/764 (2022.01); G06F 18/2415 (2023.01); *G06V 2201/10* (2022.01)

(58) Field of Classification Search
CPC ......... G06T 19/006; G06T 2207/20081; G06T 2207/20132; G06T 7/70; G06T 11/00; G06T 11/60; G06T 2207/10016; G06T 2210/12; G06T 7/11; G06T 7/20; G06T 7/579; G06T 7/73; G06T 15/005; G06T 15/04; G06T 17/00; G06T 2207/20084; G06T 2210/16; G06T 7/194; G06T 7/74; G06T 19/003; G06T 5/77; G06T 7/62; G06N 20/00; G06N 3/09; G06N 5/022;

G06N 7/01; G06F 18/214; G06F 17/18; G06F 18/24; G06F 3/011; G06F 16/2228; G06F 16/254; G06F 16/24578; G06F 16/285; G06F 16/29; G06F 18/2132;
(Continued)

(56) References Cited

U.S. PATENT DOCUMENTS

| | | |
|---|---|---|
| 10,963,740 B2 | 3/2021 | Chaubard et al. |
| 10,977,520 B2 | 4/2021 | Turkelson et al. |

(Continued)

OTHER PUBLICATIONS

Klaus Fuchs, Tobias Grundmann, and Elgar Fleisch, Towards Identification of Packaged Products via Computer Vision: Convolutional Neural Networks for Object Detection and Image Classification in Retail Environments. In Proceedings of the 9th International Conference on the Internet of Things (Year: 2019).*

*Primary Examiner* — Alex Kok S Liew
(74) *Attorney, Agent, or Firm* — Foley & Lardner LLP

(57) ABSTRACT

Systems and methods are provided for generating synthetic datasets. The system can generate a plurality of object assets, wherein each asset comprises an object of interest. A plurality of asset classes can be defined, wherein each class comprises a subset of the plurality of assets depicted in a target zone, and wherein each asset of the subset is depicted one or more times in the target zone. The system can determine, for each asset of the plurality of object assets, a representation of a number of times the asset is depicted in an asset class of the plurality of asset classes and determine one or more differences between the representations. At least one random class can be defined, wherein the at least one random class comprises one or more assets of the plurality of object assets to reduce the one or more differences between the representations.

20 Claims, 5 Drawing Sheets

(58) Field of Classification Search
  CPC .. G06F 18/2155; G06F 21/6245; G06F 3/005;
  G06F 3/04812; G06F 3/04842
  See application file for complete search history.

(56) References Cited

U.S. PATENT DOCUMENTS

| | | | |
|---|---|---|---|
| 11,093,785 B1 | 8/2021 | Siddiquie et al. | |
| 11,361,536 B2 | 6/2022 | Chakravarty et al. | |
| 11,842,321 B1 | 12/2023 | Zou et al. | |
| 2001/0026275 A1* | 10/2001 | Moriwaki | G06T 15/10 |
| | | | 345/473 |
| 2012/0087589 A1* | 4/2012 | Chang-Tsun | G06F 18/23211 |
| | | | 382/190 |
| 2016/0171707 A1 | 6/2016 | Schwartz | |
| 2017/0286773 A1 | 10/2017 | Skaff et al. | |
| 2018/0005035 A1 | 1/2018 | Bogolea et al. | |
| 2018/0107999 A1 | 4/2018 | Rizzolo et al. | |
| 2019/0080277 A1* | 3/2019 | Trivelpiece | G06N 20/00 |
| 2019/0197561 A1 | 6/2019 | Adato et al. | |
| 2020/0005225 A1 | 1/2020 | Chaubard | |
| 2020/0089997 A1 | 3/2020 | Chaubard | |
| 2020/0118064 A1 | 4/2020 | Perella et al. | |
| 2020/0210768 A1 | 7/2020 | Turkelson et al. | |
| 2021/0142105 A1* | 5/2021 | Siskind | G06T 7/20 |
| 2021/0174145 A1 | 6/2021 | Buibas et al. | |
| 2022/0083959 A1 | 3/2022 | Skaff et al. | |
| 2022/0092438 A1 | 3/2022 | Casey et al. | |
| 2022/0269907 A1 | 8/2022 | Yang et al. | |
| 2023/0274226 A1 | 8/2023 | Patil et al. | |
| 2023/0306451 A1 | 9/2023 | Chaubard | |
| 2023/0410038 A1 | 12/2023 | Mukherjee et al. | |
| 2024/0013513 A1 | 1/2024 | Morra et al. | |
| 2025/0104835 A1 | 3/2025 | Park et al. | |
| 2025/0156807 A1 | 5/2025 | Chaubard | |

* cited by examiner

CLIENT EDGE DEVICE 100

DATA COLLECTION MODULE 104

SERVER 110

ASSET GENERATION MODULE 106

ASSET COMPILATION MODULE 108

DATASET GENERATION MODULE 112

MODEL TRAINING MODULE 114

MODEL VALIDATION MODULE 116

DEPLOYMENT

Figure 3:
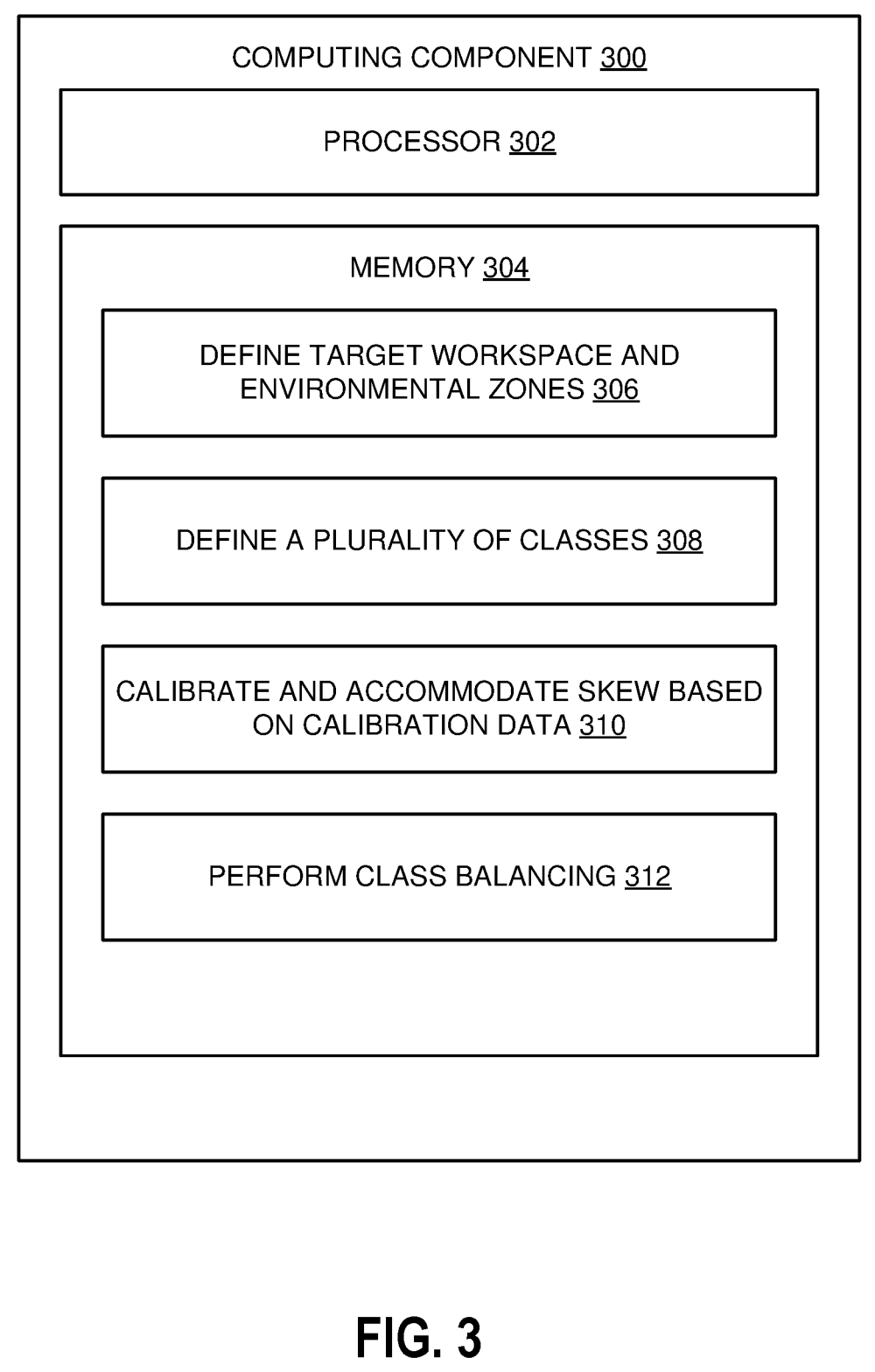

COMPUTING COMPONENT 300

PROCESSOR 302

MEMORY 304

DEFINE TARGET WORKSPACE AND ENVIRONMENTAL ZONES 306

DEFINE A PLURALITY OF CLASSES 308

CALIBRATE AND ACCOMMODATE SKEW BASED ON CALIBRATION DATA 310

PERFORM CLASS BALANCING 312

SYSTEMS AND METHODS FOR GENERATING SYNTHETIC DATA FOR STATIC BACKGROUND MODELS

CROSS-REFERENCE TO RELATED APPLICATIONS

This application is related to U.S. application Ser. No. 18/461,279, entitled SYSTEMS AND METHODS FOR ADDING A NEW ITEM TO A CONTACTLESS SALES SYSTEM and filedSep. 5, 2023, which is hereby incorporated herein by reference in its entirety.

TECHNICAL FIELD

The present disclosure relates generally to generating synthetic data to create systematic efficiencies and faster processing. In particular, examples of systems and methods are directed to generating data sets to train machine learning models that can be applied in a contactless sales system.

DESCRIPTION OF RELATED ART

Images of objects can be captured and translated to digital images that are used in online systems and inventories. Using the digital data, systems can monitor/track/keep records of these existing items as new items are added or removed from the online systems and inventories. These items can be automatically identified in contactless sales systems to update inventory as users purchase items.

BRIEF SUMMARY OF THE DISCLOSURE

In some embodiments, a computer implemented method comprises generating a plurality of assets, wherein each asset of the plurality of assets comprises an object of interest; defining a plurality of asset classes comprising a subset of the plurality of assets depicted in a target zone, wherein each asset of the subset is depicted one or more times in the target zone; determining, for each asset of the plurality of assets, a representation of a number of times the asset is depicted in an asset class of the plurality of asset classes; determining one or more differences between the representations; and defining at least one random class, wherein the at least one random class comprises one or more assets of the plurality of assets to reduce the one or more differences between the representations.

In some embodiments, a non-transitory machine-readable medium is encoded with instructions, which when executed by a processor, causes the processor to: generate a plurality of assets, wherein each asset of the plurality of assets comprises an object of interest; compile the plurality of assets into a configuration file; define a plurality of asset classes from the configuration file, wherein each asset class comprises a subset of the plurality of assets depicted in a target zone, wherein each asset of the subset is depicted one or more times in the target zone; determine, for each asset of the plurality of assets, a representation of a number of times the asset is depicted in an asset class of the plurality of asset classes; determine one or more differences between the representations; and define at least one random class, wherein the at least one random class comprises one or more assets of the plurality of assets to reduce the one or more differences between the representations.

In some embodiments, a computing device comprises a processor and a memory encoded with instructions which, when executed, cause the processor to: generate a plurality of assets, wherein each asset of the plurality of assets comprises an object of interest; define a target zone comprising a background image; define a plurality of asset classes comprising a subset of the plurality of assets depicted in the target zone, wherein each asset of the subset is depicted one or more times in the target zone; determine, for each asset of the plurality of assets, a representation of a number of times the asset is depicted in an asset class of the plurality of asset classes; determine one or more differences between the representations; and define at least one random class, wherein the at least one random class comprises one or more assets of the plurality of assets to reduce the one or more differences between the representations.

In some embodiments, defining a plurality of asset classes comprises analyzing metadata of the plurality of assets to determine whether a camera captured all images of the subset.

In some embodiments, defining a plurality of asset classes comprises placing each asset in a background image of the target zone such that the asset's location corresponds to a location where an image of the asset was captured.

In some embodiments, each asset comprises metadata on identifier for the object of interest, location of the object of interest, or camera used.

In some embodiments, an asset class of the plurality of asset classes comprises two or more assets arranged in a repeating pattern.

In some embodiments, at least two assets overlap.

In some embodiments, an asset class of the plurality of asset classes comprises copies of an asset placed in the target zone.

In some embodiments, the at least one random class comprises one or more assets of the plurality of assets arranged in a plurality of orientations.

In some embodiments, the method further comprises defining one or more environmental zones within the target zone and depicting assets evenly across all environmental zones.

In some embodiments, the target zone is bounded by dimensions of a background image.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 illustrates an example computing component for generating synthetic datasets in accordance with some embodiments.

Figure 1:
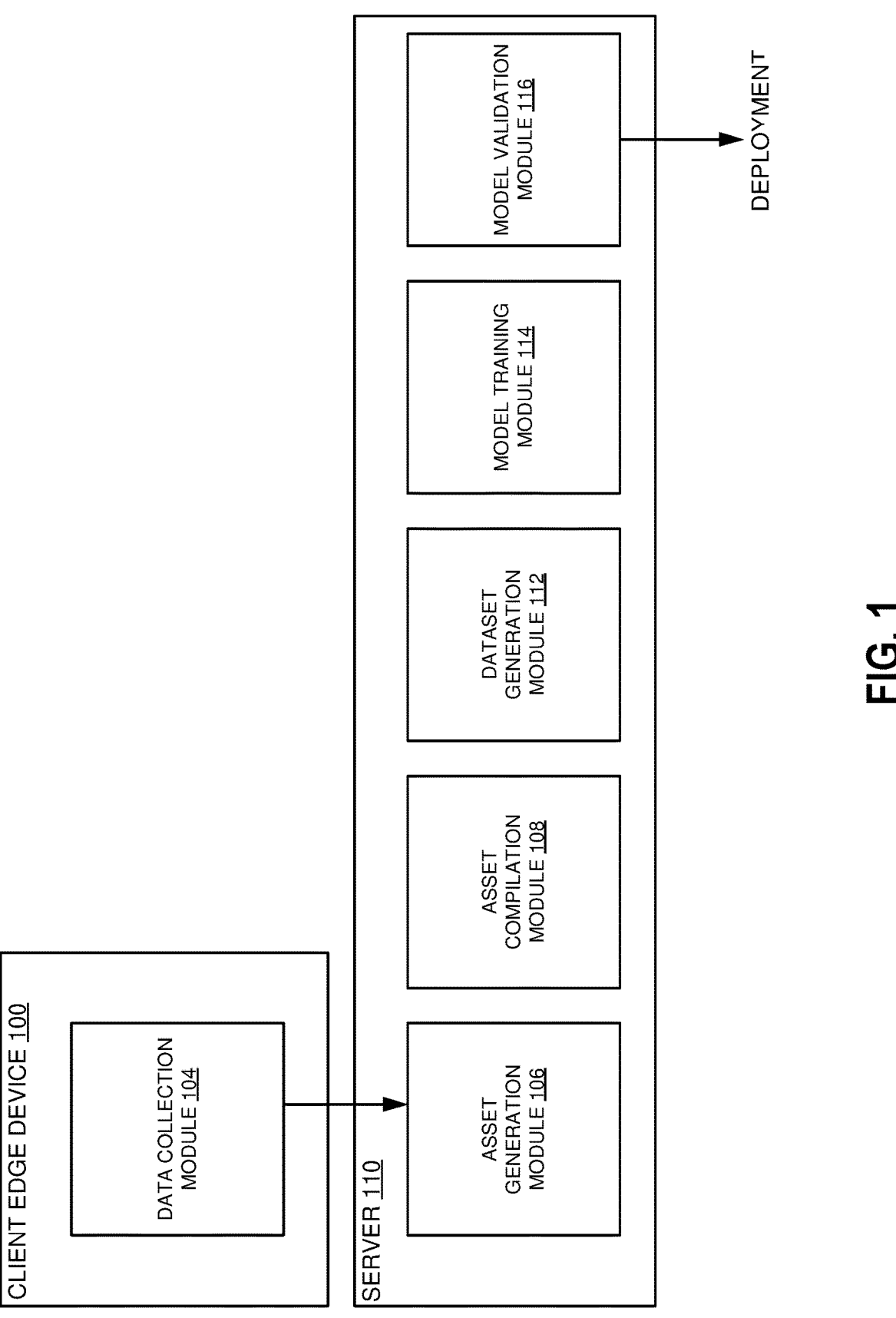
FIG. 1 is a schematic representation of a system architecture in accordance with some embodiments.

The figures are not exhaustive and do not limit the present disclosure to the precise form disclosed.

DETAILED DESCRIPTION

Contactless sales systems, with which a consumer can effectuate a purchase without human assistance can be beneficial for various reasons, including increased transaction speeds, increased data privacy of transactions, and improved inventory regulation. Traditional contactless sales systems typically rely on small barcodes or "stock keeping unit" (SKU) numbers, resulting in delays where the consumer or employee has to find the respective barcode to properly scan the item. Indeed, a precise orientation of the object is required when detecting a SKU or barcode. Furthermore, there is no guarantee that the scanners will correctly read the SKUs and barcodes. Physical wear and tear to the product can easily prevent a scanner from properly identifying a product. A scanner may also identify a product completely different from the actual product because of a SKU or barcode even though it is plainly apparent what the product actually is from the object's physical appearance.

In the context of shipping retail products, this can cause an incorrect product to be shipped to a consumer. This can cause significant delays as the user has to return the product and receive a new shipment. Similar issues can arise when adding items to inventory by scanning barcodes and/or logging the item into the system. If a product is incorrectly added to the inventory, each product may be scrutinized to find the correct relationship between a barcode/SKU and a product. There is no guarantee that a product has the correct barcode or SKU. Two of the same type of product may receive copies of barcodes, meaning the correct inventory of a particular product is unclear or inaccurate. Indeed, by adding a barcode or SKU to a product, significant effort may be required to correctly form relationships between a barcode and an individual product. Identifying a product without a SKU or barcode can assist in simplifying the inventory process and save a lot of time that would have been spent finding and scanning a correct SKU. As the inventory increases (i.e., thousands of products), the time saved becomes more apparent.

The embodiments described herein comprise a system, such as a contactless sales system, that can eliminate this delay by identifying objects at various angles or positions so that items can be added to inventory or sold quickly. In particular, the contactless sales system can recognize an object's plain appearance using one or more cameras focused on a target zone. The plain appearance of the object can refer to the general appearance of the object for human perception, i.e. without SKUs/barcode identifiers. The plain appearance can represent how an object looks when a photograph is taken of the object (e.g., in a forward direction with a camera lens pointing at the object).

An object can be placed in a target zone to be imaged by cameras. Using image processing, the system described herein, and machine learning, the object can be added to inventory or recognized as an object in the inventory without the need for additional QR codes and/or pinpoint scanners. Once a sufficient machine learning model has been created, an image containing the object can be analyzed using these models and associated with the appropriate product, including additional identifiers such as type of product, SKU, shape, etc. Note that while SKUs and barcodes can be associated with the object, they are not necessary to identifying the object.

Once the system comprises various objects and their identifiers, the system can generate datasets to be utilized in training the machine learning models for future recognition of objects. Each dataset may comprise a collection of dataset assets, which are defined as images that contain one or more objects, and an associated annotation that can comprise some identifiers of the object and location information of the object within the image.

The dataset assets used in the dataset may be generated by the system by combining object assets and background images to create one composite image and associated annotation data. In some examples, the object assets comprise altered images of objects. Background images are photographs that do not contain any object. The machine learning models used in these contactless sales systems can utilize datasets that contain a consistent number of representations of each product, varies the perspective, location, and distribution of products, and contains a large number of examples of each product. When training the machine learning model, the consistent number of representations of each product can improve the training process of the machine learning model. The model may be trained to optimize the identification of different products.

In some examples, the methods to generate the datasets and train the models can apply balancing processes to reduce potential bias (e.g., by standardizing the number of images). The system may use distribution techniques that generate a large number of product combinations and can generate an almost unlimited amount of data. Once the dataset is generated and the model is trained, the inference generated by the computer vision model can identify each of the objects included in the dataset in a real-world setting. This can help improve quality of the data that is used in the training of the machine learning model. Good quality data is difficult and time consuming to acquire, and the methods facilitate the generation of a robust, effective dataset without the manual intervention that is usually required in traditional systems.

As mentioned herein, the system can generate datasets using altered images of the objects, which in turn can assist in training the machine learning models for future recognition of objects. In particular, the system can generate a plurality of object assets, and then can utilize those object assets in the generation of a plurality of dataset assets, further described below. These object assets can comprise images of the object of interest with all background material removed, as described herein. These object assets can be stored in a database containing all available objects of interest, with an associated configuration file that can act as an inventory of the database. This database and configuration file can be stored in a central repository. This central repository can represent a product inventory of a store or other representation of individual products.

The dataset asset represents an example situation for when products are placed into the live target workspace to be identified. Using calibration techniques, the system can define a virtual target workspace within an image or images and correlate it with the live target workspace. Furthermore it can define environmental zones within the target workspace. These environmental zones can be a virtual division of the target workspace, such as a grid or cross-sections, that can be used as reference zones in the generation of dataset assets. The virtual target workspace can comprise a background image, as described herein. The virtual target workspace can be used to define a plurality of dataset assets. In some examples, a dataset asset can refer to a composite image, comprised of a plurality of object assets overlaid on the background image, paired with identifiers for each object asset, including unique identifiers and location identifiers. One factor to note, in order for the dataset asset to seem realistic, the system can reference the location and camera identifiers associated with each object asset to place them within the same environment zone and target workspace as that within which they were captured.

Figures 4A, 4B:
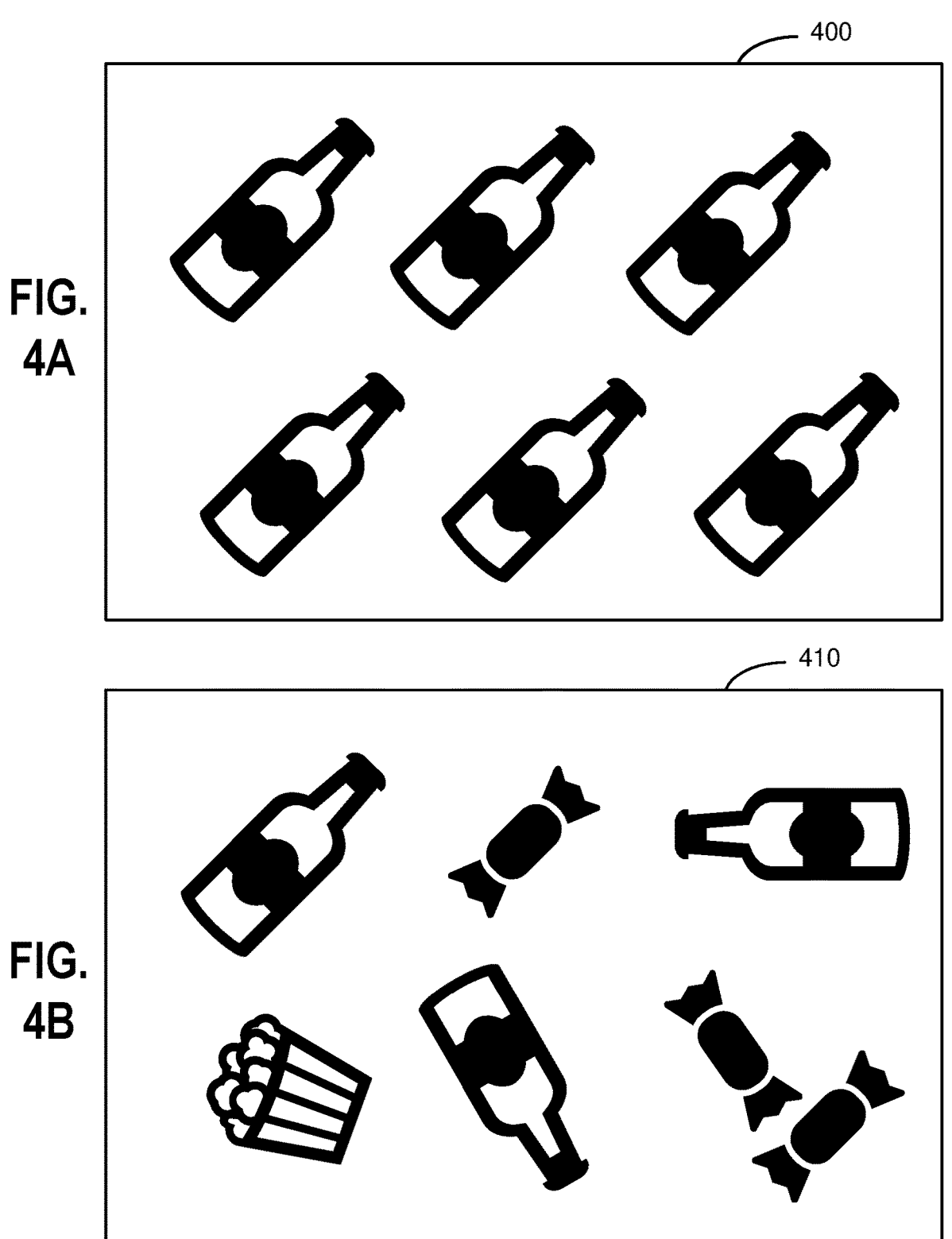
FIGS. 4A and 4B illustrate example assets including a close proximity single class and a random class in accordance with some embodiments.

In some examples, a robust and thorough dataset may be generated. One of three methods can be used. For example, a single item is repeated throughout the target workspace. The width and height of the object asset and a programmable overlap threshold are used to ensure that the object assets are very close to one another. An illustrative example of this method is illustrated in FIG. 4A. In another example, multiple target objects are placed in close proximity within the target workspace. A width and height of the object assets may be used. A programmable overlap threshold may also be used to help ensure proximity but not occlusion. In another example, a random target object may be placed in random places within the target workspace. The programmable overlap threshold is utilized to ensure that one object does not fully occlude another, and the object assets may be placed in the same environmental zone as that in which they were captured. In some examples, this method may be used to favor under-represented target objects until the dataset is comprised of the same number of representations of each target object.

As these techniques are used to generate dataset assets, the total number of representations of each target object may be calculated and maintained. The dataset can be provided to one or more machine learning models that can be trained through supervised machine learning to identify the products in each class based on the dataset assets. By utilizing one or more of these three methods, the machine learning models can be trained evenly on each asset/products so as to reduce or eliminate bias or skew, thus providing the technical improvement of more efficient and accurate machine learning methods and better computational processing.

FIG. 1 illustrates an example implementation of the systems and methods described herein. Client edge device 100 may comprise a local cluster of sensors and/or sensing systems, each of which report collected data to a local cluster server 110. That is, the data that has been gathered by client edge device 100 can be transmitted or forwarded to local cluster server 110 to be aggregated. Data for the system can be received from one or multiple cameras by the data collection module 104, which can in turn can aggregate data/images and transmit it to asset generation module 106 in server 110.

Asset generation module 106 can generate object assets for the objects of interest. An object asset can comprise an image of the object of interest with all background material removed. For example, if an image shows a bottle of water, the image can be cropped so that only pixels containing the water bottle are preserved, and any pixel that does not contain the object shall have its alpha value set to zero. Each asset can comprise metadata on an object identifier, location, camera used, or other identifiers. Assets can be compiled into a database with an associated configuration file at asset compilation module 108. The configuration file can be used to generate a dataset at dataset generation module 112, described further below. Dataset generation module can form a dataset for model training module 114. The purpose of the dataset can be to provide a representative and balanced set of the objects of interest for the machine learning module. Datasets can be formed using classes that balance the application of each object of interest, described further below.

Model training module 114 can train the machine learning model to recognize objects of interest based on images taken at various angles and settings. In the context of the end user kiosk, multiple objects can be placed into the target zone at a given time. The machine learning models can identify any of the target objects placed in the target zone regardless of orientation or position. For a consumer purchase, this allows objects to be identified and scanned without individually scanning each product's barcode or SKU. For inventory, this allows multiple objects to be added to inventory at once without scanning each product. Model training module 114 can train the machine learning model to identify objects based on simulations of the target zone. These simulations comprise images of one or more products to simulate the one or more products being placed into the target zone to be identified using one or more cameras. The data that is used for training can be tailored to focus on objects that are in close proximity. For example, it can be challenging for a machine learning model to detect two separate objects when the two objects are touching.

The datasets generated at dataset generation module 112 can contain datasets assets that place objects of interest in close proximity to one another in order to train the model to distinguish objects in a target environment. In some dataset assets, objects may overlap to simulate a product blocking the camera's view of another product. In other dataset assets, close proximity can refer to non-overlapping objects being placed next to each other without space between them. The machine learning model can be trained and subsequently validated at validation module 116. Server 110 can then deploy the trained model to an end device to be applied to detect objects placed into a sensing or target environment. For example, an end device may be a checkout stand at a retail store that can comprise one or more cameras/sensors to detect objects. Objects placed in a target environment can be sensed and automatically identified, allowing retail systems to make updates to online inventories or transaction systems.

Figure 2:
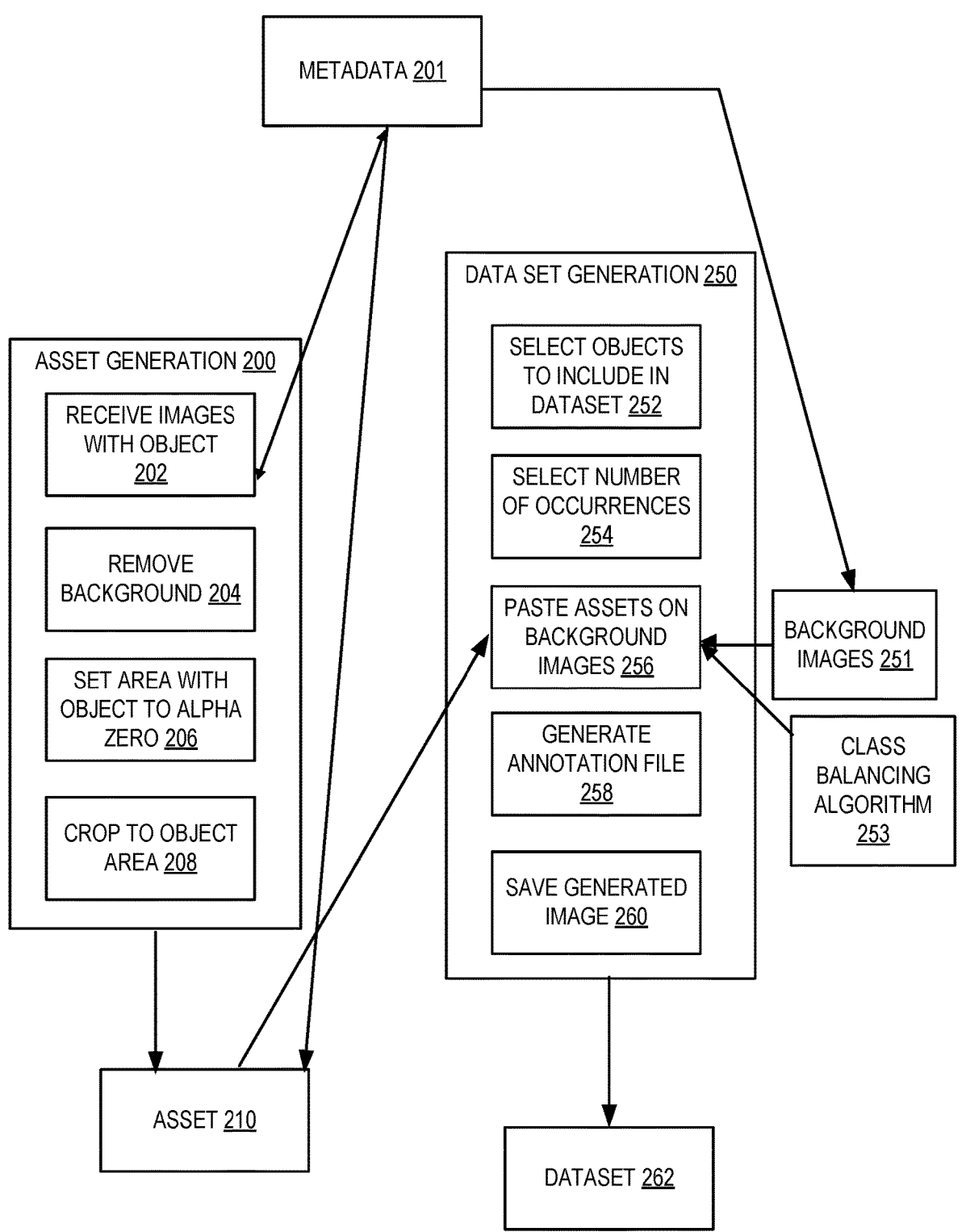
FIG. 2 is a workflow diagram of the process of generating synthetic datasets in accordance with some embodiments.

FIG. 2 illustrates an example workflow for generating a synthetic data set. At block 200, the system can generate one or more object assets for future datasets. As described herein, an object asset can comprise an image of the object of interest with all background material removed. Asset generation can start with an image containing an object.

At block 202, the system can receive this image to generate the asset. This image can comprise a background of a target space and the object of interest in the foreground. This image can comprise metadata 201, which may include a camera identifier (i.e. what camera took the image), a zone identifier (i.e. the space in the target zone where the object is located, a category identifier (such as beverages, produce, etc.), and/or an allowed overlap threshold. The allowed overlap threshold can limit how the object is placed in datasets based on how much other objects can overlap.

At block 204, the background of the image can be removed. As described above, if an image shows a bottle of water, the image can be cropped so that only pixels containing the water bottle are preserved. For example, the system may identify the edges of the object in the image by detecting object borders, then identify the exterior of the object as the background. In other examples, the background of the image may be blurred, which the system can determine is the background with the in-focus portion of the image comprising the object.

At block 206, the system may adjust the alpha value set of the image. For example, any pixel that does not contain the object can have its alpha value set to zero. At block 208, the image can be cropped to surround the object.

After the assets are generated, dataset generation can occur at block 250. At block 252, the system can select objects to include in the dataset. Datasets can be generated to represent any one or combination of products. For example, a dataset may comprise only one type of object. Alternatively, a dataset may only comprise a particular pattern of products.

At block 254, the system can select the number of occurrences of an object in the dataset. For example, a dataset may include ten copies of a water bottle, ten copies of a bag of chips, and ten copies of a candy bar. The system may determine each object using the metadata associated with the object (e.g., object type, classification, identifier, or other label) or comparison of the object in the image to a dictionary of images associated with corresponding metadata.

At block 256, assets can be pasted onto background images in accordance with the selections made in blocks 252 and 254. In some examples, asset 210 and background image 251 can be combined. Background images can comprise images of the target space without any objects. As mentioned above, assets can be compiled into a database with an associated configuration file at asset compilation module 108 of FIG. 1. The system can access the configuration file. The system may copy/paste assets identified in the configuration file onto the background images.

In some examples, assets may be placed according to their metadata. For example, assets may comprise metadata on where the image was taken. The background image may also comprise metadata 201 to correlate zones where an object should be located. This metadata can be used to determine where to place the asset on the background image. For example, if the asset has metadata indicating it was located in Zone 1, the asset can be placed in the corresponding Zone 1 in the background image. This correlation between the metadata and the location can increase the realism of the asset by ensuring the proper visual perspective is maintained.

In some examples, a class balancing algorithm 253 may be implemented. The class balancing algorithm 253 can balance the number of objects displayed in datasets to prevent machine learning bias. Class balancing can refer to the disproportionate number of representations of assets compared to each other after the single object dataset assets are generated. In some examples, this can be resolved with the addition of one or more random object dataset assets. The system can balance the representations of the objects in order to equalize the total number of assets using random object dataset assets. Class balancing algorithm 253 can help ensure that machine learning models are trained on each asset equally. After the random object dataset assets are generated, the system can process all dataset assets into one dataset for future training.

At block 258, an annotation file can be generated for the generated composite image of the background image and the asset. The annotation file describes which object assets are present in the image asset and the location of each object asset in the image asset. The combination of this annotation file with the image asset is used in the machine learning process.

At block 260, the final image can be saved into a dataset 262. Blocks 256, 258, and 260 can be repeated as needed to produce datasets that can contain any number of object assets distributed across any number of dataset assets. The process that generates an increasing number of object assets for the dataset may be stopped when an equal number of object assets is generated or some pre-determined threshold value. This dataset can be used for future training.

FIG. 3 illustrates an example computing component that may be used to generate a synthetic data set. Computing component 300 may be, for example, a server computer, a controller, or any other similar computing component capable of processing data. In the example implementation of FIG. 3, the computing component 300 includes a hardware processor 302 and memory 304.

Hardware processor 302 may be one or more central processing units (CPUs), semiconductor-based microprocessors, and/or other hardware devices suitable for retrieval and execution of instructions memory 304. Hardware processor 302 may fetch, decode, and execute instructions, such as instructions 306-312, to control processes or operations for synthetic data generation. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

Memory 304 may be any electronic, magnetic, optical, or other physical storage device that contains or stores executable instructions. Thus, memory 304 may be, for example, Random Access Memory (RAM), non-volatile RAM (NVRAM), an Electrically Erasable Programmable Read-Only Memory (EEPROM), a storage device, an optical disc, and the like. In some embodiments, memory 304 may be a non-transitory storage medium, where the term "non-transitory" does not encompass transitory propagating signals. As described in detail below, memory 304 may be encoded with executable instructions, for example, instructions 306-312.

Hardware processor 302 may execute instruction 306 to define a target workspace and an environmental zone. As described above, the target workspace can comprise a background image of the live space where products will be placed. The target workspace can be bounded by image dimensions or defined by a background image representation of the background space. The space can be large enough to contain an asset image. Environmental zones can be subsets of the target workspace, which can be defined using grids or subdivisions of the target workspace. For example, a target workspace can be subdivided into a 3×3 grid or subzones, evenly spaced squares, etc. The zones may be skewed depending on the camera angle or the number of cameras used to photograph the space.

Hardware processor 302 may execute instruction 308 to define an asset class. The asset class can comprise a subset of the plurality of assets depicted in the target zone. For example, the system may define an asset class comprises analyzing metadata of the plurality of object assets to determine whether a camera captured all images of the subset.

In some examples, objects of interest to be included in a dataset. As described above, a dataset asset can refer to an image of the target space with one or more object assets overlaid onto the target space. In some embodiments, the object assets can be applied evenly across all environmental zones of the target space. As described above, an object asset can comprise an image of the object of interest with all background material removed.

In an illustrative example, if an image shows a bottle of a water, the image can be cropped so that only pixels containing the water bottle are preserved. Each asset can comprise metadata on an object identifier, location, camera used, or other identifiers. These assets can be copied and added to the target space in the same or different configurations with the same asset or other assets. As illustrated in FIG. 4, the assets can be in close proximity to each other, that is, such that two assets are directly next to each other without any remaining space. Some assets may even overlap. In those classes, there may be a threshold percentage of how many assets are overlapping and by what degree. The system can keep track of each overlap and refrain from overlapping once the threshold is met or exceeded.

As described above, dataset assets can be defined as a close proximity single object, close proximity multi-object, or random object. Close proximity single objects can comprise images of the target space with multiple copies of the same asset, further illustrated in FIG. 4A. For example, if an asset comprises data on a type of water bottle, a close proximity single object can comprise an image of the target space with a plurality of the same water bottle placed throughout the target space. Since the dataset asset simulates close proximity, the objects may touch without overlapping. The dataset asset can be generated by placing an image of a product in a corner of the target space. A copy of the same product can be placed directly next to the first such that the products touch but do not overlap. Another copy can be placed directly next to that product, and so on, until there is not enough space in the target space to place another product without the products overlapping. A new row can then be made by placing a copy directly below the first product. The process can be repeated for multiple rows until the whole target zone is overlaid. The resulting dataset asset replicates the scenario where a consumer places multiples of the same product into the target space.

As described herein, the system can set a threshold percentage for overlapping images. At the threshold, the system can determine if a product can be added without overlapping. If the threshold would be exceeded, the system can instead start a new row directly below the first copy. The final image can comprise the dataset asset. A close proximity multi-object can involve two or more different products in the same target zone. Products can be placed in a pattern (e.g. first, second, third, first, second, third, etc.) wherein copies of the same products are configured and oriented in the same way. In close proximity multi-object, some of the products may overlap. Random objects can comprise a random assortment of products and orientations of these products, as illustrated in FIG. 4B. As described further below, random objects can be applied to balance the total number of each asset across all dataset assets.

Hardware processor 302 may execute instruction 310 to calibrate the objects and accommodate for skew based on the calibration data. The system can generate a number of close proximity single objects for each asset or a number of close proximity multi-objects evenly distributing the assets. The system can keep track of the number of copies of each asset across all dataset assets. For example, the system can generate ten representations of a first object, ten representations of a second object, and so on until all assets have an equal number of close proximity single objects. Using the multiclass example, the system can generate ten representations of a first and third object, ten representations of a first and second object, and ten representations of a second and third object. The equal number of single objects can be used to calibrate machine learning models trained to identify the objects or for other data training purposes.

Hardware processor 302 may execute instruction 312 to perform class balancing. Class balancing can refer to the disproportionate number of representations of assets compared to each other after the single object dataset assets are generated. This can be resolved with the addition of one or more random object dataset assets. For example, ten dataset assets of an object can result in eighty copies of the asset, whereas ten dataset assets of a second object can result in 60 copies of the asset. If the system applies only the twenty dataset assets described above, the machine learning models can be skewed due to bias. In particular, the machine learning models may be more prone to identifying the first object. The system can balance the representations of the objects in order to equalize the total number of assets using random object dataset assets. Using the above example, the random object dataset assets could add an additional twenty copies of the second object. This class balancing can ensure that machine learning models are trained on each asset equally. After the random object dataset assets are generated, the system can process all dataset assets into one dataset for future training.

FIGS. 4A and 4B illustrate example assets including a close proximity single class and a random class in accordance with some embodiments.

In example 400, a close proximity single object dataset asset is illustrated. As described in FIG. 3, close proximity single object dataset assets can comprise images of the target space with multiple copies of the same object asset. The dataset asset can be generated by placing the first image in a corner of the target space and overlaying a copy directly next to it, and so on until the image cannot fit in the space without overlapping another object.

In example 410, an example random object dataset asset is illustrated. This dataset asset differentiates from close proximity multi-object dataset assets because the same asset can be oriented in a different manner. As described above, the random object dataset asset can be generated to account for any skew in the total number of each asset across the dataset assets.

In addition to the composite images, dataset assets can include metadata about the object asset used in the generation of the asset. This metadata is called an annotation, and it is the "ground truth" that the machine learning model uses during training. The annotation can tell the machine learning model which pixels within the composite image are important. These annotations can be automatically generated during the generation of the composite image, and associated with said image. The annotation can be stored in a format that the framework used to train the machine learning model can interpret and contains identifying information about the object of interest, including a unique identifier of the object of interest, and the coordinates that correlate to the position of the object of interest in the composite image.

Figure 5:
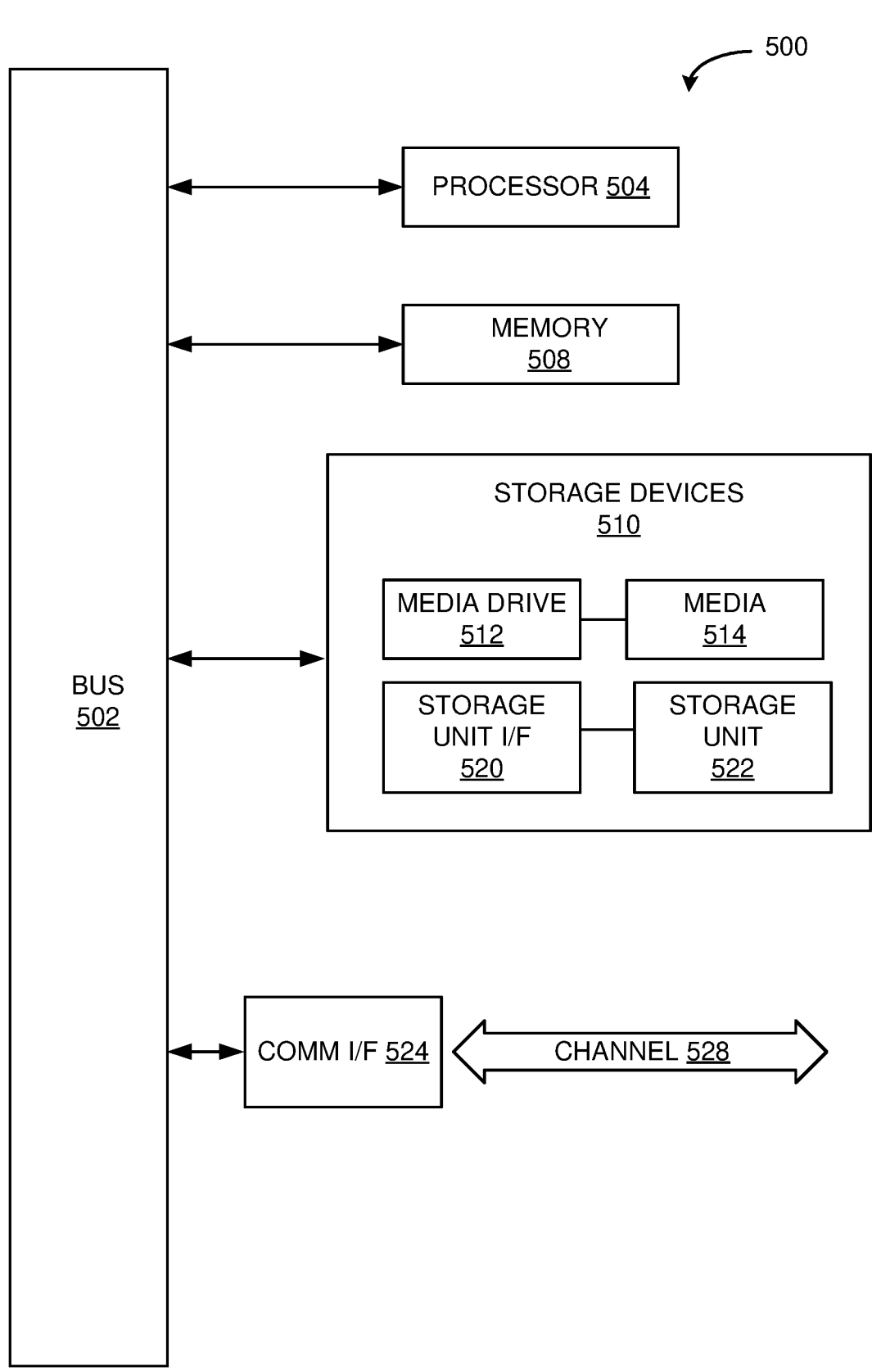
FIG. 5 is an example computing component that may be used to implement various features in accordance with some embodiments.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/ functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects, and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
   generating a plurality of object assets, wherein individual ones of the plurality of object assets comprise an object of interest;
   defining a plurality of asset classes comprising a subset of the plurality of object assets depicted in a target zone, wherein individual ones of the plurality of asset classes of the subset of the plurality of object assets is depicted in the target zone;
   determining, for the subset of the plurality of object assets depicted in the target zone, a representation of a number of times the asset is depicted in an asset class of the plurality of asset classes;
   determining one or more differences between the representations; and
   defining at least one random class, wherein the at least one random class comprises one or more assets of the plurality of object assets to reduce the one or more differences between the representations.

2. The computer-implemented method of claim 1, wherein defining the plurality of asset classes comprises analyzing metadata of the plurality of object assets to determine whether a camera captured all images of the subset.

3. The computer-implemented method of claim 2, wherein defining the plurality of asset classes comprises placing each asset in a background image of the target zone such that a location of the asset corresponds to where an image of the asset was captured.

4. The computer-implemented method of claim 1, wherein each asset comprises metadata on identifier for the object of interest, location of the object of interest, or camera used.

5. The computer-implemented method of claim 1, wherein an asset class of the plurality of asset classes comprises two or more assets arranged in a repeating pattern.

6. The computer-implemented method of claim 3, wherein at least two assets overlap.

7. The computer-implemented method of claim 1, wherein an asset class of the plurality of asset classes comprises copies of an asset placed in the target zone.

8. The computer-implemented method of claim 1, wherein the at least one random class comprises one or more assets of the plurality of object assets arranged in a plurality of orientations.

9. The computer-implemented method of claim 1, further comprising defining one or more environmental zones within the target zone and depicting assets evenly across the one or more environmental zones.

10. The computer-implemented method of claim 1, wherein the target zone is bounded by dimensions of a background image.

11. A computing device comprising:
   a processor; and
   a memory encoded with instructions which, when executed, cause the processor to:
      generate a plurality of object assets, wherein each asset of the plurality of object assets comprises an object of interest;
      define a target zone comprising a background image;
      define a plurality of asset classes comprising a subset of the plurality of object assets depicted in the target zone, wherein each asset of the subset is depicted one or more times in the target zone;
      determine, for each asset of the plurality of object assets, a representation of a number of times the asset is depicted in an asset class of the plurality of asset classes;
      determine one or more differences between the representations; and
      define at least one random class, wherein the at least one random class comprises one or more assets of the plurality of object assets to reduce the one or more differences between the representations.

12. The computing device of claim 11, wherein each asset comprises metadata on identifier for the object of interest, location of the object of interest, or camera used.

13. The computing device of claim 11, wherein the asset class of the plurality of asset classes comprises two or more assets arranged in a repeating pattern.

14. The computing device of claim 11, wherein the asset class of the plurality of asset classes comprises copies of an asset of the plurality of object assets placed in the target zone.

15. The computing device of claim 11, wherein the at least one random class comprises one or more assets of the plurality of object assets arranged in a plurality of orientations.

16. The computing device of claim 11, wherein the target zone is bounded by dimensions of the background image.

17. A non-transitory machine-readable medium encoded with instructions, which when executed by a processor, cause the processor to:

generate a plurality of object assets, wherein individual ones of the plurality of object assets comprise an object of interest;

compile the plurality of object assets into a configuration file; 5 define a plurality of asset classes from the configuration file, wherein individual ones of the plurality of asset classes comprises a subset of the plurality of object assets depicted in a target zone, wherein each asset of the subset of the plurality of object assets is depicted 10 one or more times in the target zone;

determine, for individual assets of the plurality of object assets, a representation of a number of times the asset is depicted in an asset class of the plurality of asset classes; 15 determine one or more differences between the representations; and define at least one random class, wherein the at least one random class comprises one or more assets of the plurality of object assets to reduce the one or more 20 differences between the representations.

18. The non-transitory machine-readable medium of claim 17, wherein each asset comprises metadata on identifier for the object of interest, location of the object of interest, or camera used. 25

19. The non-transitory machine-readable medium of claim 17, wherein the asset class of the plurality of asset classes comprises two or more assets arranged in a repeating pattern.

20. The non-transitory machine-readable medium of 30 claim 19, wherein at least two assets overlap.

\*  \*  \*  \*  \*